Nov. 29, 1960  W. SOLTERMANN  2,962,268
STIRRING APPARATUS
Filed June 17, 1958
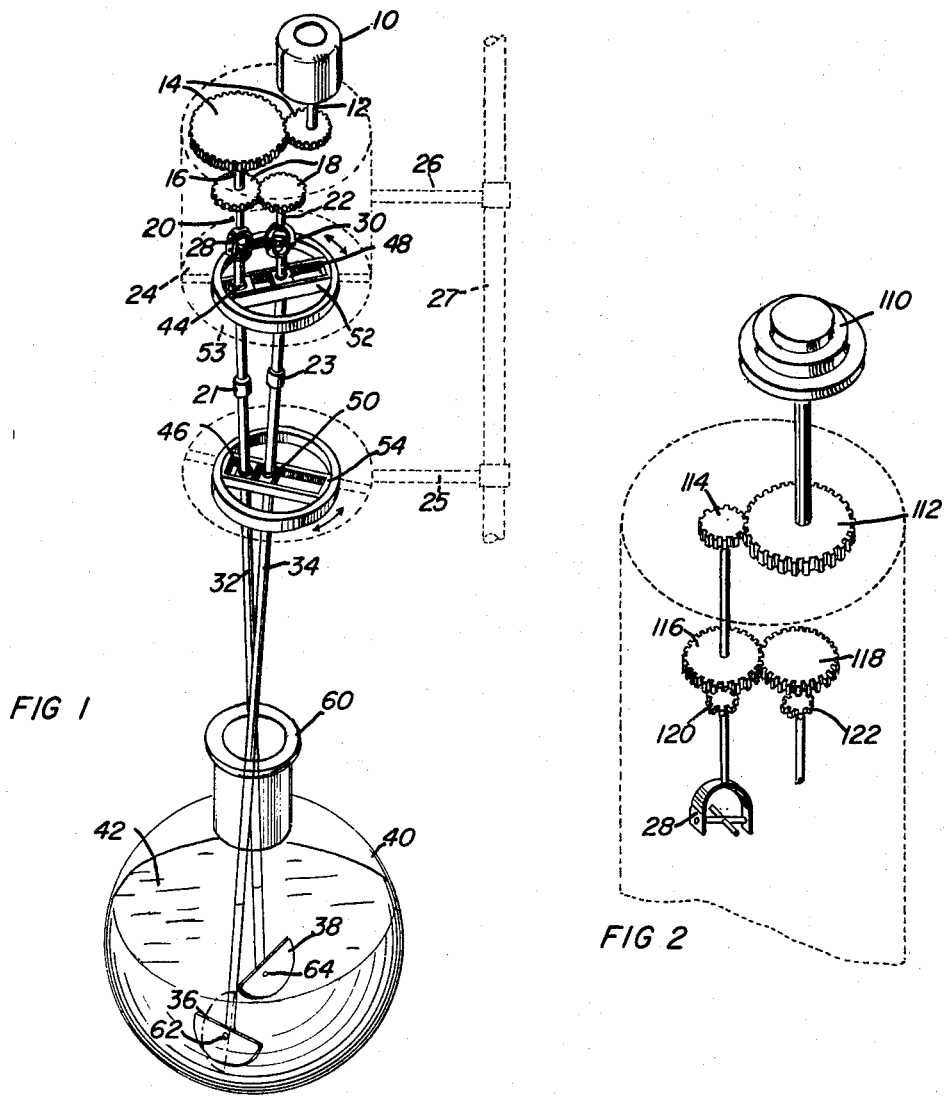
INVENTOR
WALTER SOLTERMANN
BY Wenderoth, Lind & Ponack
ATTORNEYS

United States Patent Office 2,962,268
Patented Nov. 29, 1960

2,962,268
STIRRING APPARATUS

Walter Soltermann, Birsfelden, Switzerland, assignor to Ciba Limited, Basel, Switzerland Filed June 17, 1958, Ser. No. 742,560

Claims priority, application Switzerland June 17, 1957

5 Claims. (Cl. 259—129)

This invention relates to stirring apparatus, more especially for laboratory use, for stirring and mixing liquids. Stirring apparatus to be used in a laboratory should be capable of use in a large number of different vessels and should produce an optimum stirring effect at a small output of energy, irrespective of the vessel in which it is used.

The present invention provides a stirring apparatus of the above kind, which comprises at least two stirring shafts each having a stirring member at its lower end and a universal joint at its upper end, driving means for rotating the said shafts through their universal joints, and holding means connected to the shafts between the universal joints and the stirring members for holding the shafts in adjustable position relatively to one another.

When two stirring members are provided, the arrangement is advantageously such that the stirring shafts rotate in opposite directions and are coupled together positively by the driving means.

An example of a stirring apparatus constructed in accordance with the invention is shown in the accompanying drawing, in which Fig. 1 is a perspective view of the stirring apparatus, and Fig. 2 shows a modification in which the drive includes a transmission.

A motor 10, advantageously an electric motor, is provided for driving the stirring apparatus. The motor 10 drives by means of a shaft 12 an intermediate gearing 14, which causes a reduction in speed. However, a transmission ratio of 1:1 or an increase in speed may be produced, as required. A driving shaft 16 connected to the intermediate gearing 14 drives a reversing gear 18, which has a transmission ratio of 1:1, so that two driving shafts 20 and 22 are positively rotated at the same speed but in opposite directions. These parts may be enclosed, for example, in a housing 24 shown in broken lines, and the housing may be fixed by means of a supporting arm 26 in known manner, for example, to a stand 27.

Each shaft 20 and 22 has at its lower end a universal joint 28 and 30, respectively, to which are connected by means of two easily disengageable couplings 21 and 23 two stirring shafts 32 and 34 each provided at its lower end with a stirring member 38 and 36, respectively. Advantageously the couplings have members of engagement so shaped and positioned that, when the stirring shafts are coupled, the stirring members are prevented from making contact with each other during their rotation in opposite directions. The entire stirring apparatus is so arranged that the two stirring shafts 32 and 34 extend through the neck of a spherical flask 40 as shown, which contains a quantity of a liquid 42 to be mixed. Each shaft 32 and 34 is journaled in a pair of bearings or holding means 44, 46 and 48, 50, respectively, which are advantageously pendulum bearings. The bearings 44 and 48 are mounted in a frame 52 and the bearings 46 and 50 in a frame 54. The frames 52 and 54 are rotatable relatively to one another, the frame 52 being rotatable in a guide 53 within the housing 24, and the frame 54 being rotatable in a support 25 mounted on the stand 27.

Alternatively, both of the frames 52 and 54 could be supported in the housing 24, provided that the couplings 21 and 23 are made easily accessible. Furthermore, the frame 54 may be rotatably mounted in the support 25 in a different manner, for example, by providing a link between the support and the frames. At the same time the vertical distance between the two frames must be adjustable to an extent such that, when desired, the lower frame can be brought as near as possible to the rim of the vessel. In this manner it is possible by lateral movement of the bearings 44, 46, 48 and 50 in their respective frames 52 and 54 and by rotation of the frames relatively to one another to cause angular adjustment of the two shafts 32 and 34 relatively to one another to any desired extent within the requisite range to suit the particular vessel to be used.

Thus, for example, as shown in Fig. 1, the two shafts 32 and 34 are inclined at an angle such that they cross one another in the relatively narrow opening 60 of the flask 40 and in the interior of the flask the stirring members 36 and 38 are spread wide apart sideways so as to ensure good mixing of the whole of the liquid in the flask. As shown, the two stirring members 36 and 38 are of oblong shape and are secured to the shafts 34 and 32 by means of pivots 62 and 64. Thus, when the stirring members are inserted through the neck of the flask, they can lie in a vertical direction (as shown in broken lines) and then return to the horizontal direction within the flask. If the mixing operation is to be carried out under reduced pressure or in the presence of a protective gas, the two shafts 32 and 34 are passed through the opening of a vacuum or gas closure and packed therein by means of an ordinary packing medium, for example, an annular rubber packing, a sealing ring or the like.

In Fig. 2 is shown a modified toothed wheel drive which is adapted to be driven by low speed centrally driven transmission, such as are used in large laboratories. The connecting wheel 110 drives a toothed wheel gearing 112, 114 which increases the speed. The latter gearing drives two wheels 116 and 118 that are required for imparting opposite directions of rotation to the stirring shafts, and the wheels 116 and 118 drive with a further increase in speed two toothed wheels 120 and 122 fixed to the stirring shafts.

The present invention solves the problem of providing widely adaptable stirring apparatus which is easily adjustable for use with liquid-containing vessels of various sizes and shapes, and which also ensures efficient mixing. The adaptability of the stirring apparatus to suit vessels of various shapes is achieved by the ability to adjust the shafts of the two stirring members relatively to one another in the manner desired, both with regard to the shape of the vessel in the stirring region and the inlet opening of the vessel. The use of two stirring members rotatable in opposite directions ensures a good mixing effect without producing spray, even in circular vessels having no eddy or deflecting surfaces without which, when a single stirring member or propellor is used, it is usually possible only to produce a circular motion of the contents as a whole without producing a strong mixing effect. If desired the stirring apparatus of the invention may be used for disintegration of solid substances.

It will be understood that the apparatus described with reference to the drawings represents only one of many possible constructions. Thus, for example, instead of stirring members of which the stirring surface is in one plane, there may be used stirring members having surfaces lying in different planes so as to produce a propellor action. Moreover, the construction described by way of example may be simplified in certain ways. Thus, for example, the frame 52 having the bearings 44 and 48 may be dispensed with, so that adjustment of the angle between the stirring shafts is effected solely by moving the bearings 46 and 50 longitudinally on the shafts 32 and 34. In this case the bearings should be arranged shiftably on shafts 32 and 34.

On the other hand, more than two stirring shafts may be provided, for example, by providing the reversing gearing 18 with four toothed wheels that engage each other and thus couple together positively four stirring shafts, so that each pair of adjacent shafts rotate in opposite directions.

What is claimed is:

1. Stirring apparatus, more especially for laboratory use, which comprises at least two stirring shafts each having a stirring member at its lower end and a universal joint at its upper end, driving means for rotating the said shafts connected to said universal joints, and a holding means connected to each of the shafts between the universal joints and the stirring members and holding said shafts so that they can be inclined in any direction, said holding means being attached to each other for adjustment relative to each other for adjusting and for holding the shafts in adjustable position relatively to one another.

2. Stirring apparatus as claimed in claim 1, wherein the driving means includes reverse gearing for driving the shafts at a transmission of 1:1 so that the shafts rotate in opposite directions at the same speed.

3. Stirring apparatus as claimed in claim 1, wherein the holding means comprises at least one set of bearings consisting of one bearing for each stirring shaft, and the bearings of the set holding said shafts so that they can be inclined in any direction and being movable relatively to one another transversely of the axis of the shafts.

4. Stirring appartus as claimed in claim 3, wherein the holding means comprises two sets of bearings, the bearings of each set holding said shafts so that they can be inclined in any direction and being mounted for movement relatively to one another in a common support, and the two supports being rotatable relatively to one another.

5. Stirring apparatus as claimed in claim 1, each stirring shaft being divided into an upper portion and a lower portion, and a coupling detachably connecting each lower portion to its upper portion so that the lower portion is interchangeable.

References Cited in the file of this patent

UNITED STATES PATENTS

| | | |
|---|---|---|
| Re. 15,746 | Westerman | Jan. 15, 1924 |
| 191,562 | Barland | June 5, 1877 |
| 1,169,173 | McInish | Jan. 25, 1916 |
| 2,549,490 | Kuhl | Apr. 17, 1951 |